(12) United States Patent
Li et al.

(10) Patent No.: US 12,328,702 B2
(45) Date of Patent: Jun. 10, 2025

(54) AUTONOMOUS TIMING ADVANCE COMPENSATION FOR AIR-TO-GROUND COMMUNICATION

(71) Applicant: QUALCOMM Incorporated, San Diego, CA (US)

(72) Inventors: Qiaoyu Li, Beijing (CN); Jian Li, Shanghai (CN); Chenxi Hao, Beijing (CN); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 18/546,556

(22) PCT Filed: Apr. 19, 2021

(86) PCT No.: PCT/CN2021/088035
§ 371 (c)(1),
(2) Date: Aug. 15, 2023

(87) PCT Pub. No.: WO2022/221978
PCT Pub. Date: Oct. 27, 2022

(65) Prior Publication Data
US 2024/0137888 A1  Apr. 25, 2024
US 2024/0236897 A9  Jul. 11, 2024

(51) Int. Cl.
*H04W 56/00* (2009.01)
*H04B 7/185* (2006.01)

(52) U.S. Cl.
CPC .... *H04W 56/0045* (2013.01); *H04B 7/18502* (2013.01)

(58) Field of Classification Search
CPC ................ H04W 56/0045; H04B 7/18502
See application file for complete search history.

(56) References Cited

U.S. PATENT DOCUMENTS

| 7,991,362 B2 | 8/2011 | Lane et al. |
| 2019/0393952 A1 | 12/2019 | Moffatt et al. |

(Continued)

FOREIGN PATENT DOCUMENTS

WO  2021030951 A1  2/2021

OTHER PUBLICATIONS

International Search Report and Written Opinion—PCT/CN2021/088035—ISA/EPO—Nov. 5, 2021.

(Continued)

*Primary Examiner* — Ashley Shivers
(74) *Attorney, Agent, or Firm* — Harrity & Harrity, LLP

(57) ABSTRACT

Various aspects of the present disclosure generally relate to wireless communication. In some aspects, an aerial user equipment (UE) may measure a first offset associated with a downlink frame based at least in part on a time when a downlink signal is received from a terrestrial base station. The aerial UE may determine a second offset corresponding to a starting time for the downlink frame at the terrestrial base station. The aerial UE may transmit an uplink message in an uplink frame using a timing advance that is based at least in part on a value of the first offset and a value of the second offset relative to a starting time associated with a global navigation satellite system frame duration. Numerous other aspects are described.

21 Claims, 8 Drawing Sheets

(56) References Cited

U.S. PATENT DOCUMENTS

2020/0344709 A1 10/2020 Khoryaev et al.
2022/0053487 A1* 2/2022 Sengupta .............. H04L 5/0092

OTHER PUBLICATIONS

Mediatek et al., "UL Time and Frequency Synchronisation for NR-NTN", 3GPP TSG RAN WG1 Meeting #102e, R1-2005496, 3rd Generation Partnership Project, Mobile Competence Centre, 650, Route Des Lucioles, F-06921 Sophia-Antipolis Cedex, France, vol. RAN WG1, No. Aug. 24, 2020-Aug. 28, 2020, Aug. 7, 2020, XP051914960, 14 Pages, Section 2, Section 3, Section 4.

* cited by examiner

AUTONOMOUS TIMING ADVANCE COMPENSATION FOR AIR-TO-GROUND COMMUNICATION

CROSS-REFERENCE TO RELATED APPLICATION

This application is a 371 national stage of Patent Cooperation Treaty (PCT) Application No. PCT/CN2021/088035 filed on Apr. 19, 2021, entitled "AUTONOMOUS TIMING ADVANCE COMPENSATION FOR AIR-TO-GROUND COMMUNICATION," which is hereby expressly incorporated by reference herein.

FIELD OF THE DISCLOSURE

Aspects of the present disclosure generally relate to wireless communication and to techniques and apparatuses for autonomous timing advance compensation for air-to-ground (ATG) communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by an aerial user equipment (UE) includes measuring a first offset associated with a downlink frame based at least in part on a time when a downlink signal is received from a terrestrial base station; determining a second offset corresponding to a starting time for the downlink frame at the terrestrial base station; and transmitting an uplink message in an uplink frame using a timing advance that is based at least in part on a value of the first offset and a value of the second offset relative to a starting time associated with a global navigation satellite system (GNSS) frame duration.

In some aspects, an aerial UE for wireless communication includes a memory and one or more processors, coupled to the memory, configured to: measure a first offset associated with a downlink frame based at least in part on a time when a downlink signal is received from a terrestrial base station; determine a second offset corresponding to a starting time for the downlink frame at the terrestrial base station; and transmit an uplink message in an uplink frame using a timing advance that is based at least in part on a value of the first offset and a value of the second offset relative to a starting time associated with a GNSS frame duration.

In some aspects, a non-transitory computer-readable medium storing a set of instructions for wireless communication includes one or more instructions that, when executed by one or more processors of an aerial UE, cause the aerial UE to: measure a first offset associated with a downlink frame based at least in part on a time when a downlink signal is received from a terrestrial base station; determine a second offset corresponding to a starting time for the downlink frame at the terrestrial base station; and transmit an uplink message in an uplink frame using a timing advance that is based at least in part on a value of the first offset and a value of the second offset relative to a starting time associated with a GNSS frame duration.

In some aspects, an apparatus for wireless communication includes means for measuring a first offset associated with a downlink frame based at least in part on a time when a downlink signal is received from a terrestrial base station; means for determining a second offset corresponding to a starting time for the downlink frame at the terrestrial base station; and means for transmitting an uplink message in an uplink frame using a timing advance that is based at least in part on a value of the first offset and a value of the second offset relative to a starting time associated with a GNSS frame duration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
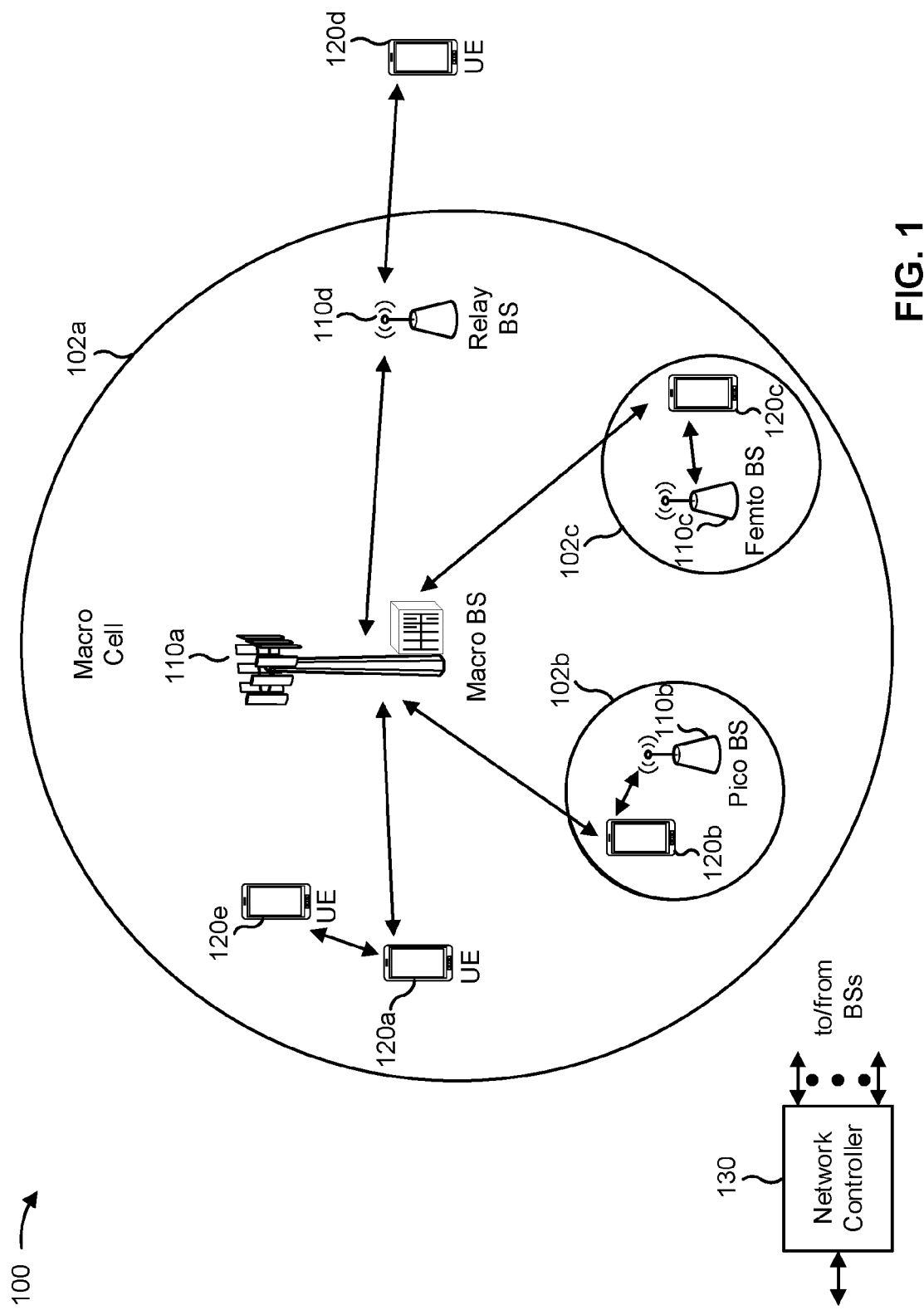
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
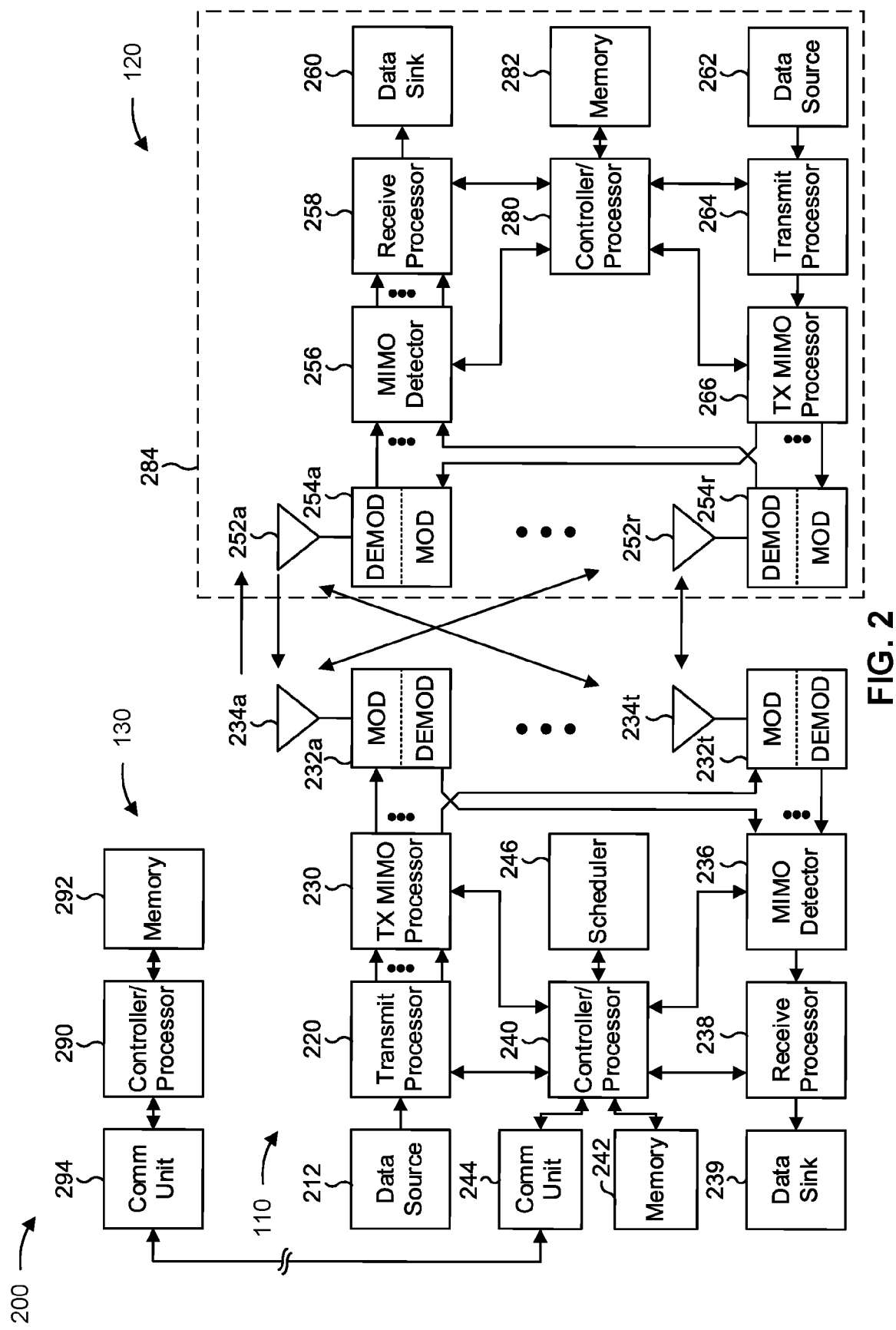
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (e.g., as described with reference to FIGS. 5A-5B and/or FIG. 6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (e.g., as described with reference to FIGS. 5A-5B and/or FIG. 6).

Controller/processor 240 of base station 110, controller/processor 280 of UE 120, and/or any other component(s) of FIG. 2 may perform one or more techniques associated with autonomous timing advance compensation for air-to-ground (ATG) communication, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions, among other examples.

In some aspects, the UE 120 includes means for measuring a first offset associated with a downlink frame based at least in part on a time when a downlink signal is received from a terrestrial base station; means for determining a second offset corresponding to a starting time for the downlink frame at the terrestrial base station; and/or means for transmitting an uplink message in an uplink frame using a timing advance that is based at least in part on a value of the first offset and a value of the second offset relative to a starting time associated with a GNSS frame duration. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for determining a timing shift between the downlink frame and the uplink frame at the terrestrial base station, wherein the timing advance is further based at least in part on the timing shift.

In some aspects, the UE 120 includes means for receiving, from the terrestrial base station, system information indicating one or more of the second offset or the timing shift.

In some aspects, the UE 120 includes means for transmitting, to the terrestrial base station, information related to an accuracy of GNSS timing information acquired by the aerial UE.

In some aspects, the UE 120 includes means for transmitting, to the terrestrial base station, information indicating a value of the timing advance.

In some aspects, the UE 120 includes means for transmitting, to the terrestrial base station, information indicating the value of the first offset relative to the starting time associated with the GNSS duration.

In some aspects, the UE 120 includes means for transmitting, to the terrestrial base station, information indicating a single trip delay between the aerial UE and the terrestrial base station based at least in part on a difference between the value of the first offset and the value of the second offset relative to the starting time associated with the GNSS duration.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
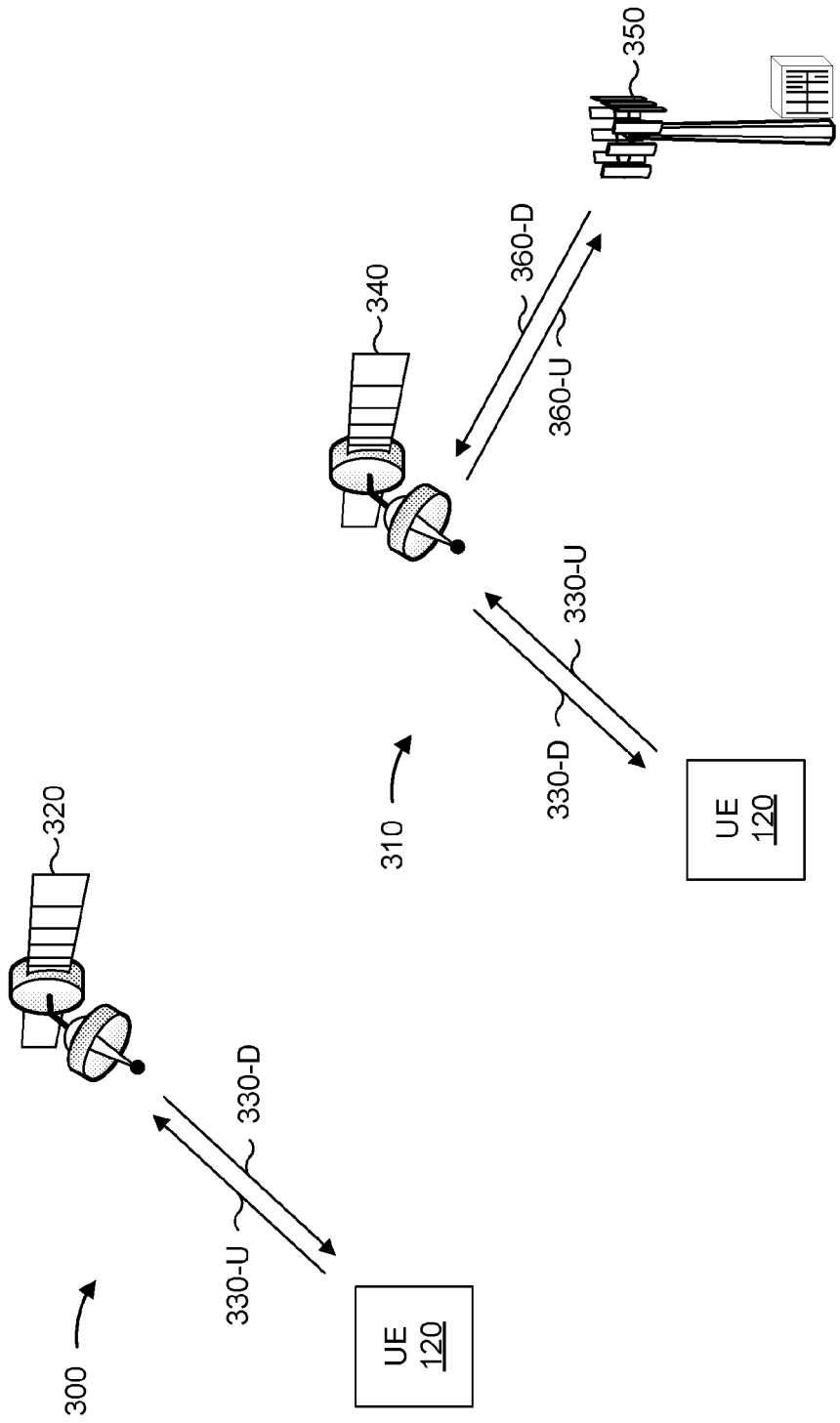
FIG. 3 is a diagram illustrating an example of a regenerative satellite deployment and an example of a transparent satellite deployment in a non-terrestrial network, in accordance with the present disclosure.

FIG. 3 is a diagram illustrating an example 300 of a regenerative satellite deployment and an example 310 of a transparent satellite deployment in a non-terrestrial network (NTN), in accordance with the present disclosure.

Example 300 shows a regenerative satellite deployment. In example 300, a UE 120 is served by a satellite 320 via a service link 330. For example, the satellite 320 may include a BS 110 (e.g., BS 110a) or a gNB. In some aspects, the satellite 320 may be referred to as a non-terrestrial base station, a regenerative repeater, and/or an on-board processing repeater, among other examples. In some aspects, the satellite 320 may demodulate an uplink radio frequency signal, and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be a transparent satellite. The satellite 340 may relay a signal received from a gateway 350 via a feeder link 360. For example, the satellite 340 may receive a radio frequency transmission from the gateway 350 via the feeder link 360, and may relay the radio frequency transmission to the UE 120 via the service link 330 without demodulating the radio frequency transmission. Additionally, or alternatively, the satellite 340 may receive a radio frequency transmission from the UE 120 via the service link 330, and may relay the radio frequency transmission to the gateway 350 via the feeder link 360 without demodulating the radio frequency transmission. In some aspects, the satellite 340 may frequency convert radio frequency transmissions received on the service link 330 to a frequency of the radio frequency transmission on the feeder link 360 (or vice versa), and may amplify and/or filter the relayed radio frequency transmission. In some aspects, the UEs 120 shown in example 300 and example 310 may be associated with a Global Navigation Satellite System (GNSS) capability or a Global Positioning System (GPS) capability, though not all UEs have such capabilities. The satellite 340 may provide a cell that covers the UE 120.

As shown in FIG. 3, the service link 330 may include a link between the satellite 340 and the UE 120, and may include one or more of an uplink or a downlink. The feeder link 360 may include a link between the satellite 340 and the gateway 350, and may include one or more of an uplink (e.g., from the UE 120 to the gateway 350) or a downlink (e.g., from the gateway 350 to the UE 120). As shown in FIG. 3, an uplink of the service link 330 is indicated by reference number 330-U and a downlink of the service link 330 is indicated by reference number 330-D. Similarly, an uplink of the feeder link 360 is indicated by reference number 360-U and a downlink of the feeder link 360 is indicated by reference number 360-D.

The feeder link 360 and the service link 330 may each experience Doppler effects due to the movement of the satellites 320 and 340, and potentially movement of a UE 120. The Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency. Furthermore, due to the long distance between the UE 120 and satellite 320/340, communication in an NTN may be associated with a much longer delay (e.g., longer latency and/or round trip time) than a terrestrial network. The delay may be even greater in a transparent satellite deployment, as any communication between the UE 120 and the gateway 350 must travel over the service link 330 and the feeder link 360, each of which may associated with a longer delay than a terrestrial network. The large propagation delay in an NTN may pose various challenges, including how to determine a timing advance that the UE 120 is to use for an uplink transmission (e.g., a negative offset between the start of a downlink slot at the UE 120 and the start of an uplink slot at the UE 120, such that the downlink and uplink slots are aligned or synchronized at a serving node, which may correspond to the satellite 320 in an NTN associated with a regenerative satellite deployment or the gateway 350 in an NTN associated with a transparent satellite deployment).

As indicated above, FIG. 3 is provided as an example. Other examples may differ from what is described with regard to FIG. 3.

Figure 4:
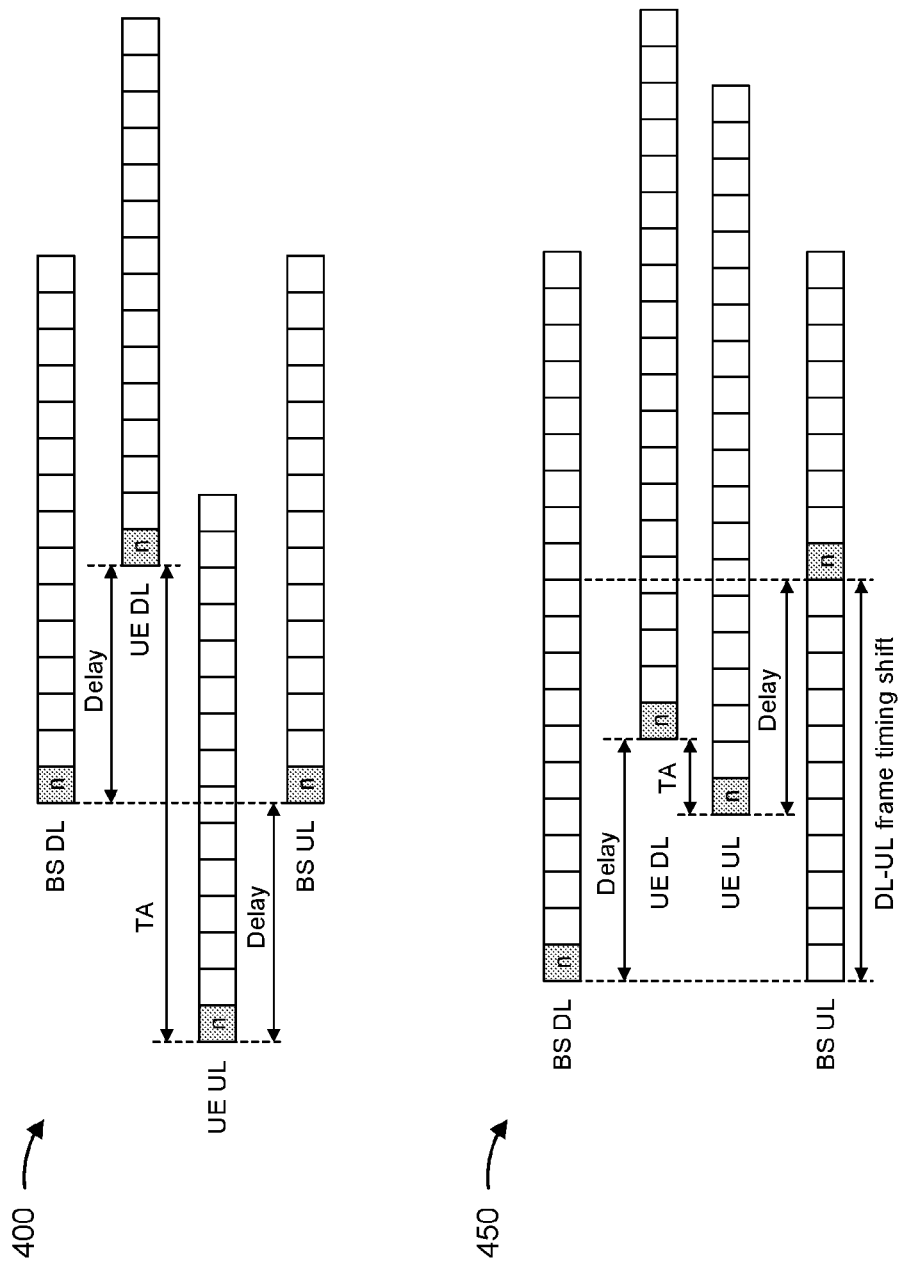
FIG. 4 is a diagram illustrating examples of timing advances that may be applied to compensate for a large propagation delay in a wireless network, in accordance with the present disclosure.

FIG. 4 is a diagram illustrating examples 400, 450 of timing advances that may be applied to compensate for a large propagation delay in a wireless network, in accordance with the present disclosure. For example, a propagation delay in an NTN may vary from several milliseconds to hundreds of milliseconds, depending on a satellite altitude and/or orbit height, among other examples.

As shown in FIG. 4, and by example 400, a timing advance to compensate for a large propagation delay may be determined in cases where the nth downlink slot and the nth uplink slot are aligned at a base station. For example, in cases where the nth downlink slot and the nth uplink slot are aligned at the base station, the timing advance may be determined such that an uplink transmission from a UE arrives at the base station at a time that is aligned with a downlink transmission to the UE. Accordingly, as shown, a propagation delay between the base station and the UE may be defined by a time between the nth downlink slot at the base station (shown as BS DL) and the nth downlink slot at the UE (shown as UE DL). In order to ensure that an uplink transmission in the nth uplink slot arrives at the base station at the same time as the downlink transmission in the nth downlink slot at the base station, the UE may apply a timing advance that is based at least in part on the propagation delay between the base station and the UE. For example, as shown, the propagation delay may be applied as a negative offset from the start of the nth uplink slot at the base station, which is aligned with the nth uplink slot at the base station in example 400. Accordingly, as shown, the UE may apply the timing advance relative to the nth downlink slot at the UE such that an uplink transmission by the UE in the nth uplink slot (shown as UE UL) occurs prior to the start of the nth uplink slot at the base station and arrives at the base station at a time that is synchronized with the nth uplink slot at the base station. In general, determining the timing advance to be applied at the UE when the nth downlink and uplink slots are aligned at the base station may offer reduced base station complexity because uplink reception is synchronized with downlink transmission. However, as shown in FIG. 4, the timing advance applied at the UE may have a large value when based on an alignment between the nth downlink and uplink slots at the base station.

Accordingly, as shown in FIG. 4, and by example 450, a timing advance to compensate for a large propagation delay may be determined based on a downlink-to-uplink frame timing shift in effect at the base station (e.g., a non-zero downlink-to-uplink frame timing shift, as example 400 where the nth essentially corresponds to a case where a downlink-to-uplink frame timing shift in effect at the base station is zero). In such cases, the UE may apply a UE-specific differential timing advance that has a smaller value than shown in example 400 due to the downlink-to-uplink frame timing shift. For example, as shown, a propagation delay between the base station and the UE may be defined by a time between the nth downlink slot at the base station (shown as BS DL) and the nth downlink slot at the UE (shown as UE DL). In the case of a non-zero downlink-to-uplink frame timing shift, the nth uplink slot at the base station (shown as BS UL) is shifted later in time relative to the nth downlink slot at the base station. Accordingly, as shown, the propagation delay may be applied as a negative offset from the start of the nth uplink slot at the base station, resulting in a timing advance that is applied at the UE relative to the nth downlink slot at the UE (e.g., a time at which a downlink transmission in the nth downlink slot is received at the UE). Accordingly, an uplink transmission by the UE in the nth uplink slot (shown as UE UL) occurs prior to the start of the nth downlink slot at the UE and arrives at the base station at a time that is synchronized with the nth uplink slot at the base station. In this way, a non-zero downlink-to-uplink frame timing shift may result in a smaller timing advance at the UE. However, this technique may increase base station complexity to manage potential side effects caused by the shift in timing between downlink and uplink slots.

In general, as described above, techniques to determine a timing advance to be applied at a UE may be used to compensate in wireless networks where there is a large propagation delay between a base station and a UE, such as an NTN. Furthermore, similar issues related to large propagation delays may occur in an air-to-ground (ATG) communication system where an aerial UE (e.g., a manned or unmanned aircraft) communicates with a terrestrial base station (e.g., a base station located on the ground). For example, in an ATG communication system, a terrestrial base station typically has a large inter-site distance (e.g., from about 100 kilometers to 200 kilometers) in order to control network deployment costs due to a relatively limited amount of aerial UEs that need wireless service (e.g., due to air traffic control constraining the number of flights that are permitted in an area at any one time). Furthermore, when an aerial UE is located over water (e.g., over a sea or ocean), the distance between the aerial UE and the terrestrial base station may exceed 200 kilometers and may be as large as 300 kilometers, which can result in very large propagation delays. For example, in an ATG communication system with a subcarrier spacing of 30 kHz for a carrier frequency of 4.8

GHz with downlink and uplink frames aligned at the terrestrial base station, a maximum timing advance based on a round trip delay may approach 2 milliseconds (or four slots) when an aerial UE is 300 kilometers from the terrestrial base station.

In a terrestrial wireless network (e.g., where the UE and the base station are both located on the ground), a base station typically signals the timing advance that a UE is to apply using UE-specific timing advance commands (e.g., medium access control (MAC) control element (MAC-CE) and/or downlink control information (DCI)-based timing advance commands). However, signaling the timing advance that the UE is to apply using a UE-specific timing advance command may be unsuitable in an NTN or ATG communication system. For example, in satellite communications, different terrestrial UEs may experience different propagation delays depending on a distance between the terrestrial UE and the satellite, resulting in timing advance values that have a large variance. In such cases, timing advance commands carried in a MAC-CE may be problematic due to the high speed at which satellites are traveling, whereby the timing advance that is signaled in a MAC-CE could already be outdated by the time that the UE receives and decodes the timing advance command. Furthermore, similar challenges may arise in an ATG communication system, where aerial UEs typically travel at flight speeds up to 1200 kilometers per hour, which could result in a timing advance drifting up to 2 microseconds per second. Furthermore, DCI-based commands consume significant physical downlink control channel (PDCCH) resources and indication overhead, which can lead to reduced reliability.

Some aspects described herein relate to techniques and apparatuses to enable autonomous timing advance compensation for ATG communication. For example, in an ATG communication system, an aerial UE and a terrestrial base station may each be equipped with a GNSS receiver that allows the aerial UE and the terrestrial base station to synchronize with GNSS timing. Furthermore, because the terrestrial base station is at a fixed location on the ground, a timing relationship between the terrestrial base station and the GNSS timing may be relatively constant or predictable. Accordingly, some aspects described herein enable an aerial UE to autonomously determine a timing advance to be applied for an uplink transmission based at least in part on GNSS timing information. For example, the aerial UE may be synchronized with the GNSS timing, whereby the aerial UE may determine a starting time for a GNSS frame. The aerial UE may measure the starting time of a downlink frame at the UE (e.g., a time at which a downlink transmission is received from the terrestrial base station) relative to the starting time for the GNSS frame. Furthermore, the aerial UE may determine the starting time of the downlink frame at the base station as an offset relative to the starting time of the GNSS frame (e.g., based on system information broadcasted by the terrestrial base station and/or information stored in a database) and a downlink-to-uplink frame timing shift in effect at the terrestrial base station, which may have a zero or non-zero value. In this way, the aerial UE may derive the propagation delay between the terrestrial base station and the aerial UE, which may enable the aerial UE to autonomously determine a timing advance to be applied as a negative offset relative to the start of an uplink frame at the terrestrial base station.

As indicated above, FIG. 4 is provided as an example. Other examples may differ from what is described with regard to FIG. 4.

Figure 5A:
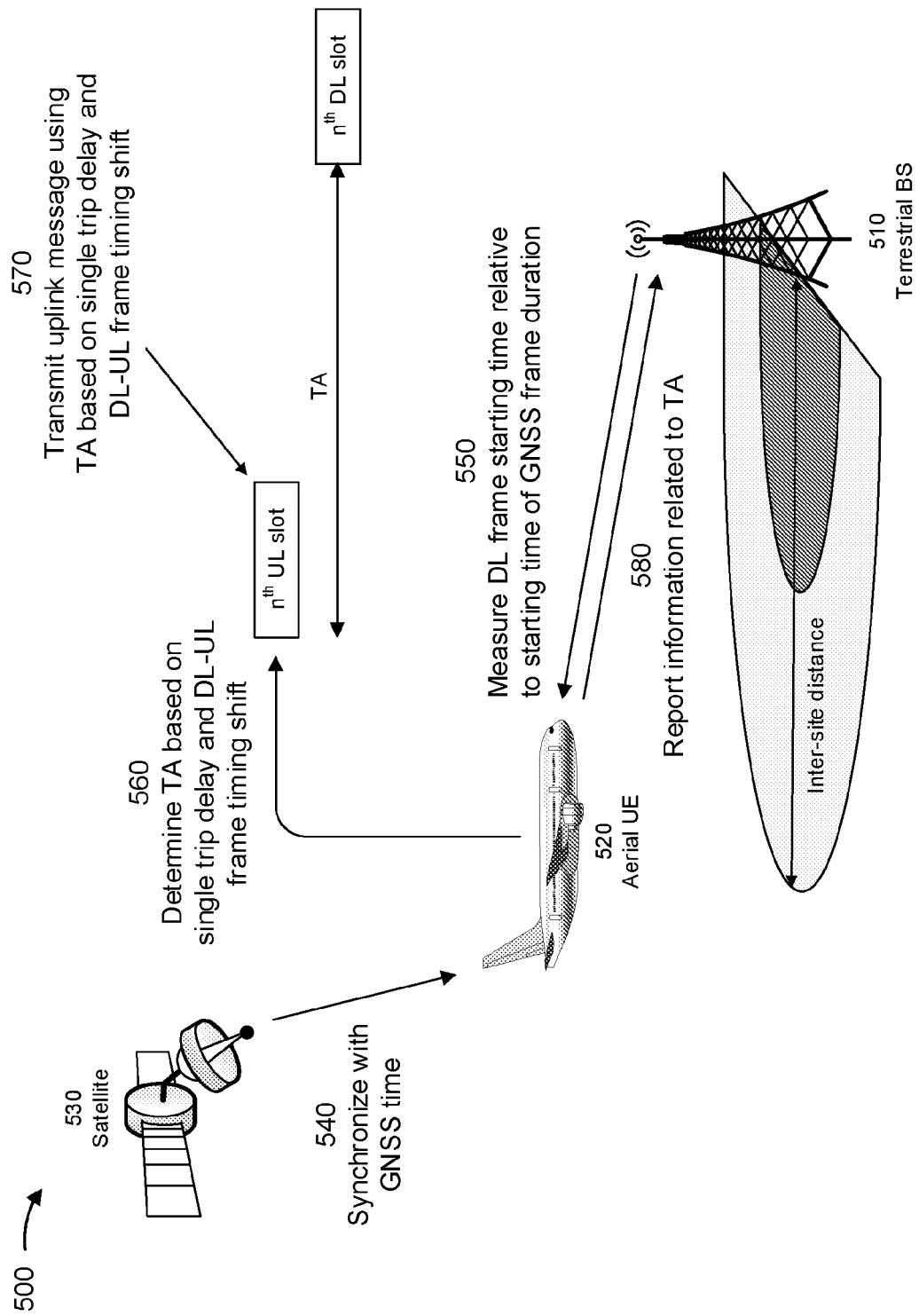
FIGS. 5A-5B are diagrams illustrating an example associated with autonomous timing advance compensation for air-to-ground (ATG) communication, in accordance with the present disclosure.
Figure 5B:
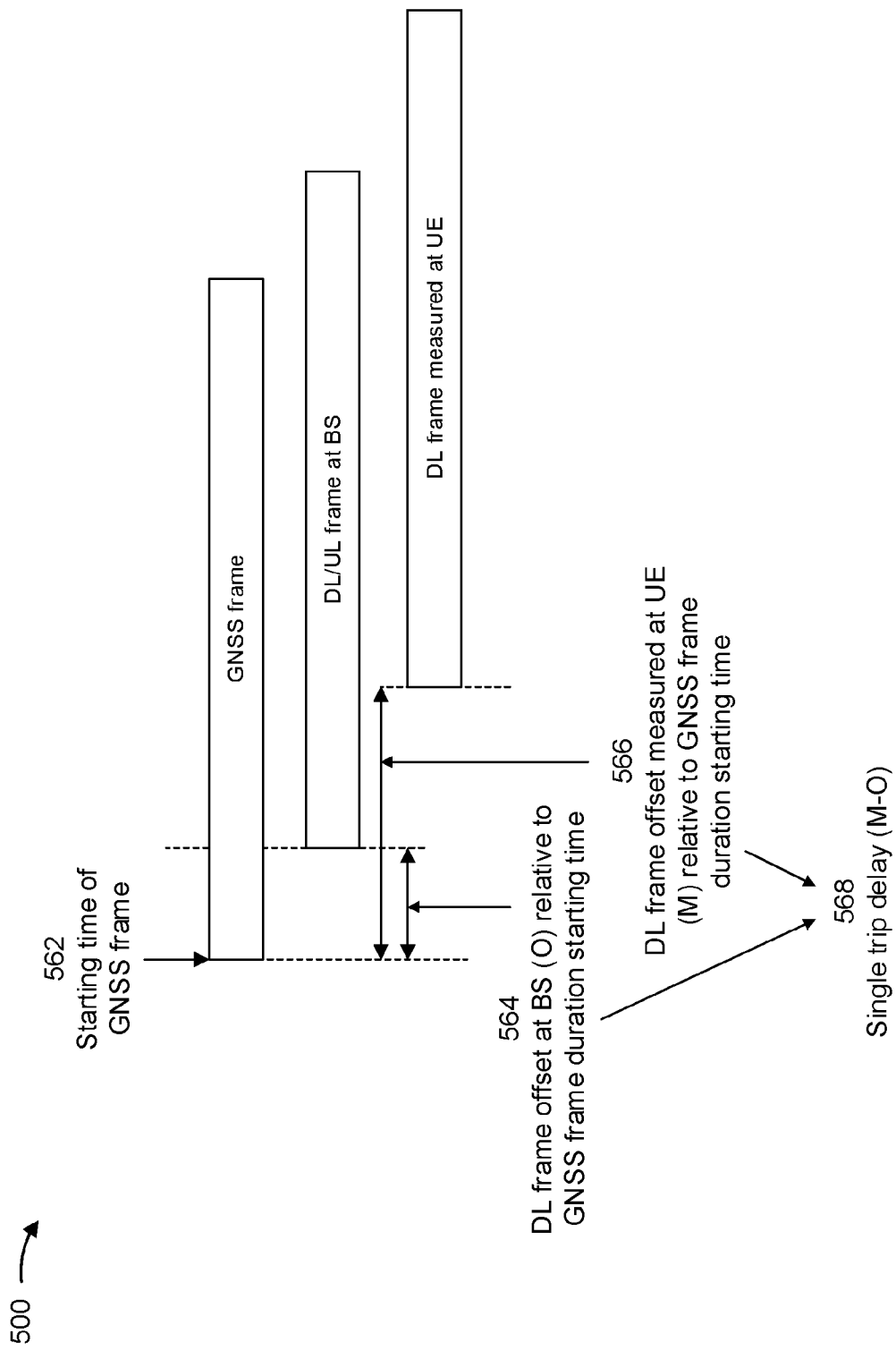

FIGS. 5A-5B are diagrams illustrating an example 500 associated with autonomous timing advance compensation for ATG communication, in accordance with the present disclosure. As shown in FIG. 5A, example 500 includes communication between a terrestrial base station 510 and an aerial UE 520 (e.g., a manned or unmanned aircraft). In some aspects, the terrestrial base station 510 and the aerial UE 120 may be included in a wireless network, such as wireless network 100, and may communicate via a wireless access link, which may include an uplink and a downlink. As further shown, at least the aerial UE 520 may be in communication with a satellite 530.

As shown in FIG. 5A, and by reference number 540, the aerial UE 520 may synchronize with GNSS timing based at least in part on one or more signals received from the satellite 530. For example, the satellite 530 may be deployed in a GNSS (e.g., the Global Positioning System (GPS), Global Navigation Satellite System (GLONASS), BeiDou Navigation Satellite System (BDS), and/or Galileo) together with various other satellites that have extremely precise on-board atomic clocks that use oscillations of a particular atom as a metronome. In general, GNSS positioning uses triangulation methods to determine the precise location of the aerial UE 520 based on a known distance from at least three points (e.g., three satellites). For example, the aerial UE 520 can calculate the distances by measuring the time that a periodic navigation signal takes to travel the distance between the satellite 530 and the aerial UE 520. Each periodic navigation signal may contain information related to an atomic clock on-board the satellite 530 and information related to the orbit of the satellite 530, which allows the aerial UE 520 to precisely determine the position of the satellite 530 and the distance between the aerial UE 520 and the satellite 530. Accordingly, to enable GNSS-based positioning, all satellites 530 need to be synchronized to ensure that each satellite 530 starts to transmit the periodic navigation signal at precisely the same time, which is achieved by continuously synchronizing all on-board atomic clocks with a master clock on the ground. The aerial UE 520 may therefore synchronize with GNSS timing by continuously resetting a GNSS receiver time to the GNSS time using an approximation method involving signals from at least four satellites, which results in a GNSS-based time synchronization having a typical error of less than forty (40) nanoseconds. In this way, the aerial UE 520 may precisely determine the starting time of a GNSS frame duration in which the satellite 530 transmits one or more navigation signals.

As further shown in FIG. 5A, and by reference number 550, the aerial UE 520 may measure a downlink frame starting time relative to a starting time of the GNSS frame duration. For example, in some aspects, the terrestrial base station 510 may transmit a downlink signal to the aerial UE 520 in a downlink frame, and the downlink signal may be received at the aerial UE 520 at a later time depending on the propagation delay between the terrestrial base station 510 and the aerial UE 520. Accordingly, in some aspects, the aerial UE 520 may measure or otherwise determine the time when the downlink signal is received at the aerial UE 520, and a time between the starting time of the GNSS frame duration and the time when the downlink signal is received at the aerial UE 520 may define a first offset, M. For example, as described herein, the offset M may represent an amount of time between the starting time of the GNSS frame duration and the time when the downlink signal is received at the aerial UE 520.

As further shown in FIG. 5A, and by reference number 560, the aerial UE 520 may determine a timing advance to apply for an uplink transmission in an nth uplink slot based at least in part on a single trip delay between the terrestrial base station 510 and the aerial UE 520 and a downlink-to-uplink frame timing shift. For example, in some aspects, the aerial UE 520 may determine the timing advance autonomously (e.g., without reliance on the terrestrial base station 510 or any other entity signaling the timing advance) based on the first offset M that represents the amount of time between the starting time of the GNSS frame duration and the time when the downlink signal is received at the aerial UE 520 and a second offset, O, that represents an amount of time between the starting time of the GNSS frame duration and the starting time of the downlink frame in which the terrestrial base station 110 transmits the downlink signal. In particular, a difference between the first offset and the second offset (M-O) may generally indicate the single trip delay between the terrestrial base station 110 and the aerial UE 520. Furthermore, in some aspects, the aerial UE 520 may determine the timing advance by adjusting the single trip delay according to the downlink-to-uplink frame timing shift, S, in effect at the terrestrial base station 110. For example, as described above, the downlink-to-uplink frame timing shift in effect at the terrestrial base station 110 has a zero (0) value when downlink and uplink frames are aligned at the terrestrial base station 110, or a non-zero value when an uplink frame at the terrestrial base station 110 is shifted (e.g., delayed in time) relative to the starting time of the downlink frame at the terrestrial base station 110.

In some aspects, the offset O that represents the amount of time between the starting time of the GNSS frame duration and the starting time of the downlink frame at the terrestrial base station 110 and/or the downlink-to-uplink frame timing shift, S, in effect at the terrestrial base station 110 may be indicated in system information that is broadcasted by the terrestrial base station 110 (e.g., in a system information block). Additionally, or alternatively, in cases where the offset O and/or the downlink-to-uplink frame timing shift S does not change over time (e.g., in cases where the terrestrial base station 110 has a fixed (stationary) deployment), information related to the offset O and/or the downlink-to-uplink frame timing shift S may be stored in a database or other memory that may be preloaded onto or otherwise associated with the aerial UE 520 (e.g., before a flight). In such cases, the aerial UE 520 may determine the offset O and/or the downlink-to-uplink frame timing shift S based on one or more data records in the database or other memory that associate an identifier of the terrestrial base station 510 with the offset O and/or the downlink-to-uplink frame timing shift S. Accordingly, as described herein, the aerial UE 520 may autonomously determine the timing advance to be applied for an uplink transmission to the terrestrial base station 110 based on the value of the first offset M that represents the amount of time between the starting time of the GNSS frame duration and the time when the downlink signal is received at the aerial UE 520, the value of the offset O that represents the amount of time between the starting time of the GNSS frame duration and the starting time of the downlink frame at the terrestrial base station 110, and the downlink-to-uplink frame timing shift S in effect at the terrestrial base station 110.

For example, FIG. 5B illustrates example timing relationships that the aerial UE 520 may use to autonomously determine a timing advance in cases where downlink and uplink frames are aligned at the terrestrial base station 110 (e.g., the downlink-to-uplink frame timing shift S has a zero value). In the illustrated example, reference number 562 depicts the starting time of a GNSS frame duration, which the aerial UE 520 may determine based on a synchronization with GNSS timing, as described above. Furthermore, reference number 564 depicts the offset O that represents the amount of time between the starting time of the GNSS frame duration and the starting time of the downlink frame at the terrestrial base station 510 (e.g., the starting time of the downlink frame in which a downlink signal is transmitted to the aerial UE 520), which the aerial UE 520 may determine from system information broadcasted by the terrestrial base station 110 or from information stored on the aerial UE 520 (e.g., in a database). Accordingly, reference number 566 depicts the measured downlink frame offset M relative to the starting time of the GNSS frame duration, and reference number 568 depicts that the single trip delay between the terrestrial base station 510 and the aerial UE 520 is defined by a difference between the offset M and the offset O. For example, if the aerial UE 520 determines that a downlink signal is received 1700 microseconds after the starting time of the GNSS frame duration (M=1700) and determines that the starting time of the downlink frame at the terrestrial base station 510 is 700 microseconds after the starting time of the GNSS frame duration (O=700), the aerial UE 520 may determine that the single trip delay between the terrestrial base station 510 and the aerial UE 520 is 1000 microseconds, or one (1) millisecond. The aerial UE 520 may adjust the single trip delay according to the downlink-to-uplink frame timing shift to determine the starting time of an uplink frame at the terrestrial base station 510 (e.g., as described above with reference to FIG. 4).

As further shown in FIG. 5A, and by reference number 570, the aerial UE 520 may transmit an uplink message to the terrestrial base station 510 using a timing advance that is based on the single trip delay and the downlink-to-uplink frame timing shift. For example, the aerial UE 520 may determine the starting time of an nth downlink slot at the terrestrial base station 510 based on the starting time of the GNSS frame duration and the offset O that represents the amount of time between the starting time of the GNSS frame duration and the starting time of the nth downlink slot at the terrestrial base station 110. Furthermore, the aerial UE 520 may determine the starting time of an nth uplink slot at the terrestrial base station 510 based on the starting time of the nth downlink slot at the terrestrial base station 110 and the downlink-to-uplink frame timing shift S in effect at the terrestrial base station 110. Accordingly, the aerial UE 520 may determine a time when the uplink message is to be transmitted based on the single trip delay defined by the difference between the offset M and the offset O, which may indicate a timing advance relative to the nth downlink slot at the aerial UE 520. Accordingly, the aerial UE 520 may transmit the uplink message using the autonomously determined timing advance to ensure that the uplink message is received at the terrestrial base station in the nth uplink slot.

As further shown in FIG. 5A, and by reference number 580, the aerial UE 520 may report information related to the timing advance applied at the aerial UE 520 to the terrestrial base station 510. For example, in some aspects, the aerial UE 520 may report capability information related to an accuracy of GNSS information acquired by the aerial UE 520, which may impact an accuracy of the timing advance that is autonomously determined by the aerial UE 520. Furthermore, in some aspects, the information that the aerial UE 520 reports to the terrestrial base station 510 may explicitly indicate the timing advance applied at the aerial UE 520 and/or one or more parameters used to determine the timing advance. For example, in some aspects, the aerial UE 520 may report the measured value of the offset M that represents the amount of time between the starting time of the GNSS frame duration and the time when the downlink signal is received at the aerial UE 520 (e.g., the offset of the downlink frame at the aerial UE 520 relative to the starting time of the GNSS frame duration). Additionally, or alternatively, in some aspects, the aerial UE 520 may report the single trip delay computed by the aerial UE 520 (e.g., the difference between the offset M and the offset O), which may require a smaller payload than reporting the explicit value of the timing advance or the single trip delay (e.g., because the single trip delay has a smaller range). In this way, the terrestrial base station 510 may use the information reported by the aerial UE 520 to determine the timing advance applied by the aerial UE 520 and appropriately adapting scheduling in a time domain.

As indicated above, FIGS. 5A-5B are provided as an example. Other examples may differ from what is described with regard to FIGS. 5A-5B.

Figure 6:
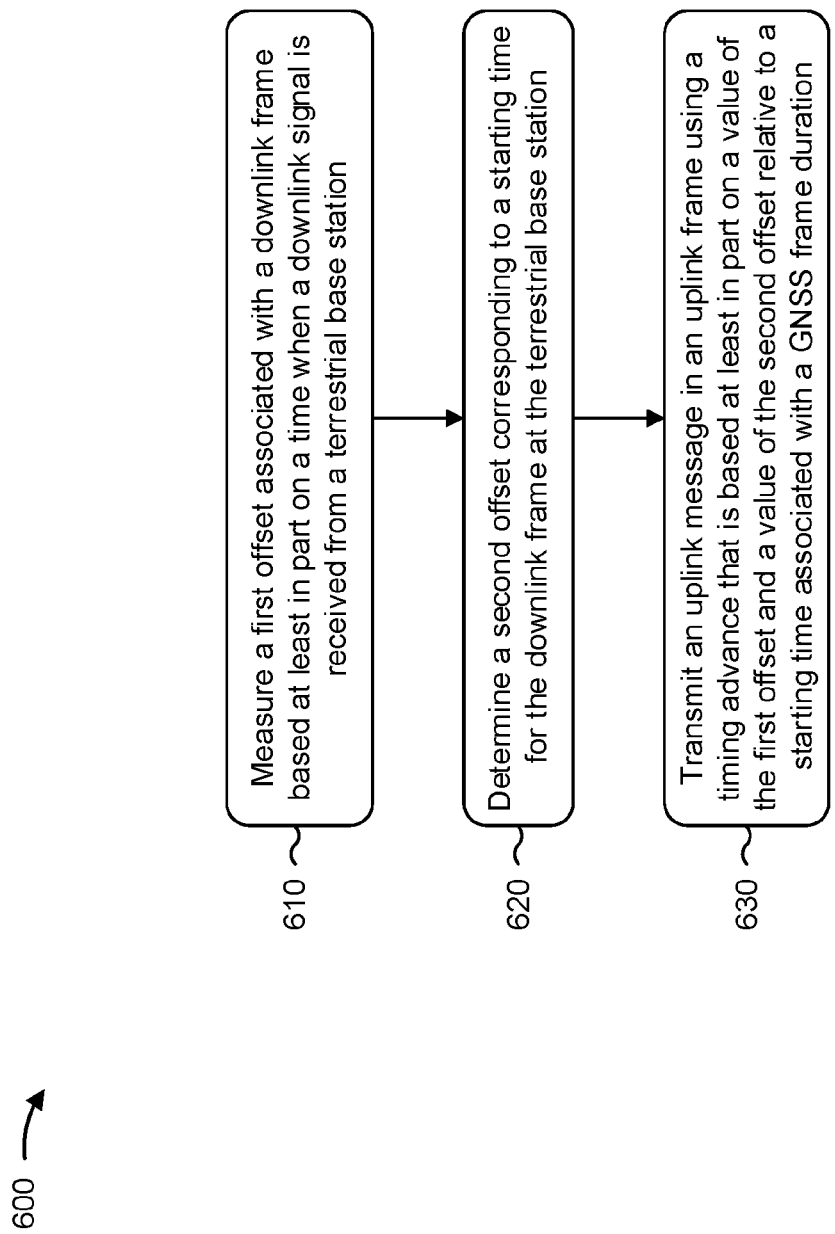
FIG. 6 is a diagram illustrating an example process associated with autonomous timing advance compensation for ATG communication, in accordance with the present disclosure.

FIG. 6 is a diagram illustrating an example process 600 performed, for example, by an aerial UE, in accordance with the present disclosure. Example process 600 is an example where the aerial UE (e.g., UE 120 and/or aerial UE 520, among other examples) performs operations associated with autonomous timing advance compensation for ATG communication.

As shown in FIG. 6, in some aspects, process 600 may include measuring a first offset associated with a downlink frame based at least in part on a time when a downlink signal is received from a terrestrial base station (block 610). For example, the aerial UE (e.g., using measurement component 708, depicted in FIG. 7) may measure a first offset associated with a downlink frame based at least in part on a time when a downlink signal is received from a terrestrial base station, as described above.

As further shown in FIG. 6, in some aspects, process 600 may include determining a second offset corresponding to a starting time for the downlink frame at the terrestrial base station (block 620). For example, the aerial UE (e.g., using determination component 710, depicted in FIG. 7) may determine a second offset corresponding to a starting time for the downlink frame at the terrestrial base station, as described above.

As further shown in FIG. 6, in some aspects, process 600 may include transmitting an uplink message in an uplink frame using a timing advance that is based at least in part on a value of the first offset and a value of the second offset relative to a starting time associated with a GNSS frame duration (block 630). For example, the aerial UE (e.g., using transmission component 704, depicted in FIG. 7) may transmit an uplink message in an uplink frame using a timing advance that is based at least in part on a value of the first offset and a value of the second offset relative to a starting time associated with a GNSS frame duration, as described above.

Process 600 may include additional aspects, such as any single aspect or any combination of aspects described below and/or in connection with one or more other processes described elsewhere herein.

In a first aspect, process 600 includes determining a timing shift between the downlink frame and the uplink frame at the terrestrial base station, wherein the timing advance is further based at least in part on the timing shift.

In a second aspect, alone or in combination with the first aspect, process 600 includes receiving, from the terrestrial base station, system information indicating one or more of the second offset or the timing shift.

In a third aspect, alone or in combination with one or more of the first and second aspects, the system information received from the terrestrial base station further indicates a value of the GNSS frame duration.

In a fourth aspect, alone or in combination with one or more of the first through third aspects, one or more of the second offset or the timing shift is determined based at least in part on information, stored at the aerial UE, that associates the terrestrial base station with the second offset or the timing shift.

In a fifth aspect, alone or in combination with one or more of the first through fourth aspects, the information stored at the aerial UE further indicates a value of the GNSS frame duration.

In a sixth aspect, alone or in combination with one or more of the first through fifth aspects, process 600 includes transmitting, to the terrestrial base station, information related to an accuracy of GNSS timing information acquired by the aerial UE.

In a seventh aspect, alone or in combination with one or more of the first through sixth aspects, process 600 includes transmitting, to the terrestrial base station, information indicating a value of the timing advance.

In an eighth aspect, alone or in combination with one or more of the first through seventh aspects, process 600 includes transmitting, to the terrestrial base station, information indicating the value of the first offset relative to the starting time associated with the GNSS duration.

In a ninth aspect, alone or in combination with one or more of the first through eighth aspects, process 600 includes transmitting, to the terrestrial base station, information indicating a single trip delay between the aerial UE and the terrestrial base station based at least in part on a difference between the value of the first offset and the value of the second offset relative to the starting time associated with the GNSS duration.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
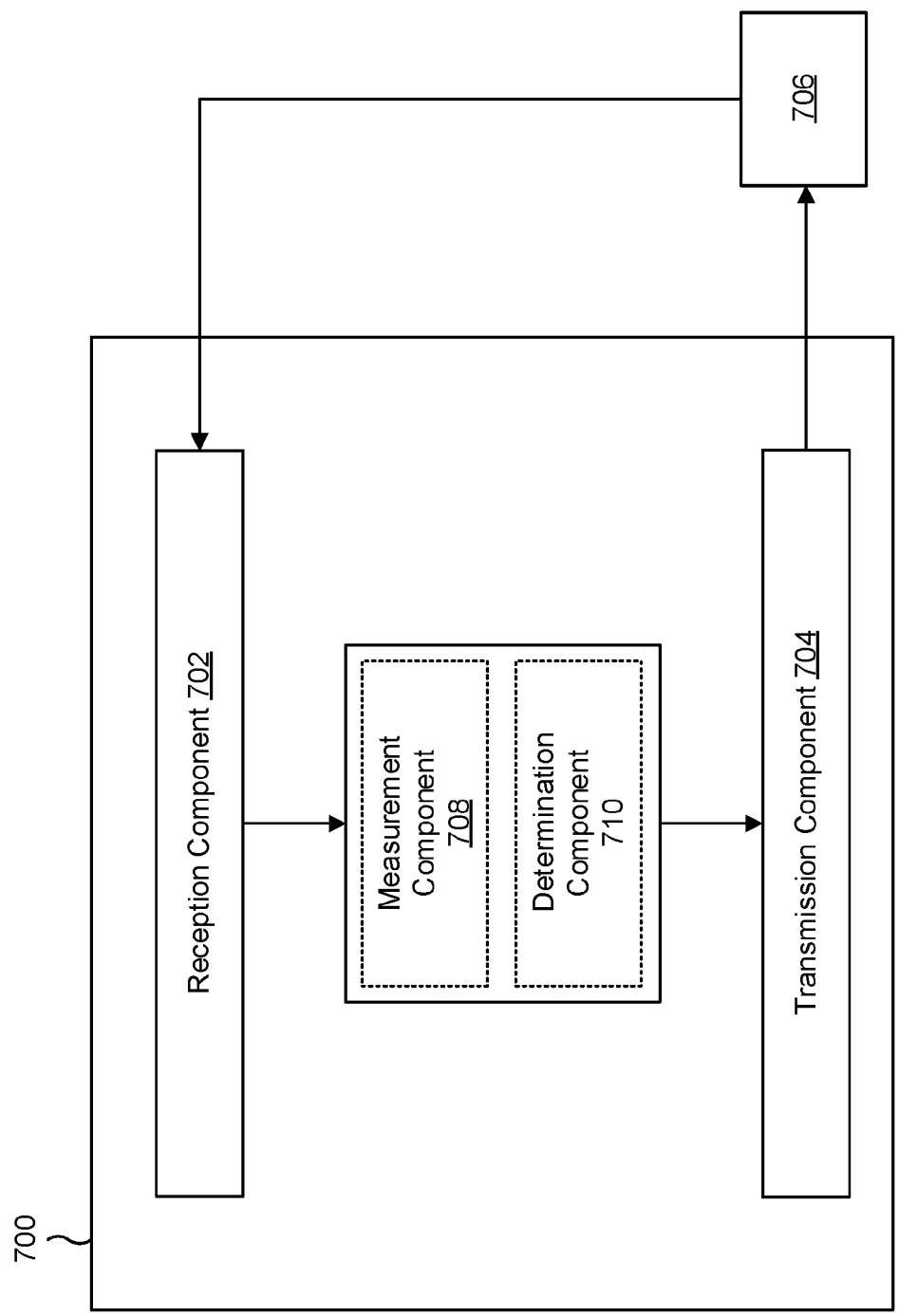
FIG. 7 is a block diagram of an example apparatus for wireless communication, in accordance with the present disclosure.

FIG. 7 is a block diagram of an example apparatus 700 for wireless communication. The apparatus 700 may be an aerial UE, or an aerial UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a measurement component 708 or a determination component 710, among other examples.

In some aspects, the apparatus 700 may be configured to perform one or more operations described herein in connection with FIGS. 5A-5B. Additionally, or alternatively, the apparatus 700 may be configured to perform one or more processes described herein, such as process 600 of FIG. 6. In some aspects, the apparatus 700 and/or one or more components shown in FIG. 7 may include one or more components of the aerial UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the aerial UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the aerial UE described above in connection with FIG. 2. In some aspects, the transmission component 704 may be co-located with the reception component 702 in a transceiver.

The measurement component 708 may measure a first offset associated with a downlink frame based at least in part on a time when a downlink signal is received from a terrestrial base station. The determination component 710 may determine a second offset corresponding to a starting time for the downlink frame at the terrestrial base station. The transmission component 704 may transmit an uplink message in an uplink frame using a timing advance that is based at least in part on a value of the first offset and a value of the second offset relative to a starting time associated with a GNSS frame duration.

The determination component 710 may determine a timing shift between the downlink frame and the uplink frame at the terrestrial base station, wherein the timing advance is further based at least in part on the timing shift.

The reception component 702 may receive, from the terrestrial base station, system information indicating one or more of the second offset or the timing shift.

The transmission component 704 may transmit, to the terrestrial base station, information related to an accuracy of GNSS timing information acquired by the aerial UE.

The transmission component 704 may transmit, to the terrestrial base station, information indicating a value of the timing advance.

The transmission component 704 may transmit, to the terrestrial base station, information indicating the value of the first offset relative to the starting time associated with the GNSS duration.

The transmission component 704 may transmit, to the terrestrial base station, information indicating a single trip delay between the aerial UE and the terrestrial base station based at least in part on a difference between the value of the first offset and the value of the second offset relative to the starting time associated with the GNSS duration.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by an aerial UE, comprising: measuring a first offset associated with a downlink frame based at least in part on a time when a downlink signal is received from a terrestrial base station; determining a second offset corresponding to a starting time for the downlink frame at the terrestrial base station; and transmitting an uplink message in an uplink frame using a timing advance that is based at least in part on a value of the first offset and a value of the second offset relative to a starting time associated with a GNSS frame duration.

Aspect 2: The method of Aspect 1, further comprising: determining a timing shift between the downlink frame and the uplink frame at the terrestrial base station, wherein the timing advance is further based at least in part on the timing shift.

Aspect 3: The method of Aspect 2, further comprising: receiving, from the terrestrial base station, system information indicating one or more of the second offset or the timing shift.

Aspect 4: The method of Aspect 3, wherein the system information received from the terrestrial base station further indicates a value of the GNSS frame duration.

Aspect 5: The method of Aspect 2, wherein one or more of the second offset or the timing shift is determined based at least in part on information, stored at the aerial UE, that associates the terrestrial base station with the second offset or the timing shift.

Aspect 6: The method of Aspect 5, wherein the information stored at the aerial UE further indicates a value of the GNSS frame duration.

Aspect 7: The method of any of Aspects 1-6, further comprising: transmitting, to the terrestrial base station, information related to an accuracy of GNSS timing information acquired by the aerial UE Aspect 8: The method of any of Aspects 1-7, further comprising: transmitting, to the terrestrial base station, information indicating a value of the timing advance.

Aspect 9: The method of any of Aspects 1-8, further comprising: transmitting, to the terrestrial base station, information indicating the value of the first offset relative to the starting time associated with the GNSS duration.

Aspect 10: The method of any of Aspects 1-9, further comprising: transmitting, to the terrestrial base station, information indicating a single trip delay between the aerial UE and the terrestrial base station based at least in part on a difference between the value of the first offset and the value of the second offset relative to the starting time associated with the GNSS duration.

Aspect 11: An apparatus for wireless communication at a device, comprising a processor; memory coupled with the processor; and instructions stored in the memory and executable by the processor to cause the apparatus to perform the method of any of Aspects 1-10.

Aspect 12: A device for wireless communication, comprising a memory and one or more processors coupled to the memory, the memory and the one or more processors configured to perform the method of any of Aspects 1-10.

Aspect 13: An apparatus for wireless communication, comprising at least one means for performing the method of any of Aspects 1-10.

Aspect 14: A non-transitory computer-readable medium storing code for wireless communication, the code comprising instructions executable by a processor to perform the method of any of Aspects 1-10.

Aspect 15: A non-transitory computer-readable medium storing a set of instructions for wireless communication, the set of instructions comprising one or more instructions that, when executed by one or more processors of a device, cause the device to perform the method of any of Aspects 1-10.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a–b, a–c, b–c, and a–b–c, as well as any combination with multiples of the same element (e.g., a–a, a–a–a, a–a–b, a–a–c, a–b–b, a–c–c, b–b, b–b–b, b–b–c, c–c, and c–c–c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by an aerial user equipment (UE), comprising:
   measuring a first offset associated with a downlink frame based at least in part on a time when a downlink signal is received from a terrestrial base station;
   determining a second offset corresponding to a starting time for the downlink frame at the terrestrial base station; and
   transmitting an uplink message in an uplink frame using a timing advance that is based at least in part on a value of the first offset and a value of the second offset relative to a starting time associated with a global navigation satellite system (GNSS) frame duration.

2. The method of claim 1, further comprising:
   determining a timing shift between the downlink frame and the uplink frame at the terrestrial base station, wherein the timing advance is further based at least in part on the timing shift.

3. The method of claim 2, further comprising:
   receiving, from the terrestrial base station, system information indicating one or more of the second offset or the timing shift.

4. The method of claim 3, wherein the system information received from the terrestrial base station further indicates a value of the GNSS frame duration.

5. The method of claim 2, wherein one or more of the second offset or the timing shift is determined based at least in part on information, stored at the aerial UE, that associates the terrestrial base station with the second offset or the timing shift.

6. The method of claim 5, wherein the information stored at the aerial UE further indicates a value of the GNSS frame duration.

7. The method of claim 1, further comprising:
transmitting, to the terrestrial base station, information related to an accuracy of GNSS timing information acquired by the aerial UE.

8. The method of claim 1, further comprising:
transmitting, to the terrestrial base station, information indicating a value of the timing advance.

9. The method of claim 1, further comprising:
transmitting, to the terrestrial base station, information indicating the value of the first offset relative to the starting time associated with the GNSS duration.

10. The method of claim 1, further comprising:
transmitting, to the terrestrial base station, information indicating a single trip delay between the aerial UE and the terrestrial base station based at least in part on a difference between the value of the first offset and the value of the second offset relative to the starting time associated with the GNSS duration.

11. An aerial user equipment (UE) for wireless communication, comprising:
a memory; and
one or more processors, coupled to the memory, configured to:
measure a first offset associated with a downlink frame based at least in part on a time when a downlink signal is received from a terrestrial base station;
determine a second offset corresponding to a starting time for the downlink frame at the terrestrial base station; and
transmit an uplink message in an uplink frame using a timing advance that is based at least in part on a value of the first offset and a value of the second offset relative to a starting time associated with a global navigation satellite system (GNSS) frame duration.

12. The aerial UE of claim 11, wherein the one or more processors are further configured to:
determine a timing shift between the downlink frame and the uplink frame at the terrestrial base station, wherein the timing advance is further based at least in part on the timing shift.

13. The aerial UE of claim 12, wherein the one or more processors are further configured to:
receive, from the terrestrial base station, system information indicating one or more of the second offset or the timing shift.

14. The aerial UE of claim 13, wherein the system information received from the terrestrial base station further indicates a value of the GNSS frame duration.

15. The aerial UE of claim 12, wherein one or more of the second offset or the timing shift is determined based at least in part on information, stored at the aerial UE, that associates the terrestrial base station with the second offset or the timing shift.

16. The aerial UE of claim 15, wherein the information stored at the aerial UE further indicates a value of the GNSS frame duration.

17. The aerial UE of claim 11, wherein the one or more processors are further configured to:
transmit, to the terrestrial base station, information related to an accuracy of GNSS timing information acquired by the aerial UE.

18. The aerial UE of claim 11, wherein the one or more processors are further configured to:
transmit, to the terrestrial base station, information indicating a value of the timing advance.

19. The aerial UE of claim 11, wherein the one or more processors are further configured to:
transmit, to the terrestrial base station, information indicating the value of the first offset relative to the starting time associated with the GNSS duration.

20. The aerial UE of claim 11, wherein the one or more processors are further configured to:
transmit, to the terrestrial base station, information indicating a single trip delay between the aerial UE and the terrestrial base station based at least in part on a difference between the value of the first offset and the value of the second offset relative to the starting time associated with the GNSS duration.

21. An apparatus for wireless communication, comprising:
means for measuring a first offset associated with a downlink frame based at least in part on a time when a downlink signal is received from a terrestrial base station;
means for determining a second offset corresponding to a starting time for the downlink frame at the terrestrial base station; and
means for transmitting an uplink message in an uplink frame using a timing advance that is based at least in part on a value of the first offset and a value of the second offset relative to a starting time associated with a global navigation satellite system (GNSS) frame duration.

* * * * *